United States Patent [19]

Hooper et al.

[11] Patent Number: 5,225,977
[45] Date of Patent: Jul. 6, 1993

[54] CARD PAYMENT SYSTEM FOR SERVICE DISPENSING DEVICES

[76] Inventors: John B. Hooper, 70 Beacon St., Marblehead, Mass. 01945; Jefferson C. Hooper, 44 Summer St., Nahant, Mass. 01908

[21] Appl. No.: 671,252

[22] Filed: Mar. 18, 1991

[51] Int. Cl.[5] .................................................. G06F 15/21
[52] U.S. Cl. .................................... 364/401; 235/375; 235/381
[58] Field of Search .............. 364/401, 402, 403, 410; 235/381, 380, 375, 376, 382

[56] References Cited

U.S. PATENT DOCUMENTS

| Re. 32,115 | 4/1986 | Lockwood et al. | 235/381 |
|---|---|---|---|
| 3,705,384 | 12/1972 | Wahlberg | 235/381 |
| 3,931,497 | 1/1976 | Gentile et al. | 235/381 |
| 4,249,648 | 2/1981 | Meyer | 364/405 |
| 4,370,550 | 1/1983 | Sidline | 235/380 |
| 4,567,359 | 1/1986 | Lockwood | 235/381 |
| 4,575,622 | 3/1986 | Pellegrini | 235/382 |
| 4,598,810 | 7/1986 | Shore et al. | 235/381 |
| 4,677,565 | 6/1987 | Ogaki et al. | 235/381 |
| 4,727,975 | 3/1988 | Eisermann | 235/382.5 |
| 4,731,575 | 3/1988 | Sloan | 235/381 |
| 4,778,983 | 10/1988 | Ushikubo | 235/381 |
| 4,795,892 | 1/1989 | Gilmore et al. | 235/381 |
| 4,814,592 | 3/1989 | Bradt et al. | 235/375 |
| 4,831,242 | 5/1989 | Englehardt et al. | 364/401 |
| 4,900,903 | 2/1990 | Wright et al. | 235/381 |
| 4,905,813 | 3/1990 | Rademacher | 364/479 |
| 4,935,608 | 6/1990 | Tanaka | 364/401 |
| 4,954,697 | 9/1990 | Kokubun et al. | 235/381 |
| 5,038,022 | 8/1991 | Lucero | 364/410 |

OTHER PUBLICATIONS

Debitek Card Systems brochure, "Debitalk", vol. 1, Issue 1, 1988.

Primary Examiner—Robert Weinhardt

[57] ABSTRACT

Laundry facility management system comprises a laundry service device, controlled by an operating control; and a local controller connected to the service device and a central controller, connected together for the transfer of information between them. The local controller stores a current device rate, representing current cost of service provided by the connected service device, and reads a card identifier provided on and uniquely identifying a presented service card Local controller requestor derives from a read card identifier and from the current device rate an authorization request, and transmits it to the central controller. The central controller receives an account balance payment message providing a particular card identifier and a payment value, and stores account balance signals for at least one account, each account being uniquely indexed by a particular card identifier. Account manager responds to a received authorization request to update the account balance indexed by the card identifier of the authorization request by the current device rate value of the authorization request, and transmits an authorization message to the local controller. The local controller responds to a received authorization message to output a control signal on the control output to control the service device operating control to provide the requested service. The account manager responds to a received account balance payment message to credit the stored account balance indexed by the particular card identifier by the payment value of the received account balance message.

11 Claims, 6 Drawing Sheets

CARD PAYMENT SYSTEM FOR SERVICE DISPENSING DEVICES

BACKGROUND OF THE INVENTION

This invention relates to the management of laundry facilities, particularly public laundry facilities having a plurality of laundry service devices of various types, such as washers and dryers.

The laundry service devices of public laundry facilities of this kind are typically activated by payment of coins, which are collected at each service device. The intending user of the facility must obtain a sufficient number of coins of the correct denomination, typically quarter dollars, to activate the machines for a number of cycles of operation sufficient to meet his needs. It can be an inconvenience for the intending user to accumulate and bring with him the necessary coins. Many public laundry facilities provide bill changers, which accept currency bills and dispense coins for the convenience of the user.

There are several disadvantages to this method of paying for the operation of the laundry service devices. A large number of coins must be stocked in the bill changers, and a large number of coins are accumulated at each service device. This ties up operating capital for the owner of the facility. In addition, the presence of a large amount of currency and coins on the premises makes the facility a target for theft and vandalism. Further, the owner must employ a trustworthy person to make frequent collections of the accumulated coins and bills; and the task of counting the coins is time consuming. For example, it requires about four hours a week to manage the coinage in a facility having fifty service devices. This increases the cost of running the facility and decreases the profits.

Further, the use of coins, typically quarter dollars, limits the rate (cost per unit of operation) which can be charged to multiples of the coin. Thus an owner must set his rate exactly at a multiple of a quarter dollar: for example, $1.00 or $1.25. Smaller increments of cost cannot be charged to the customer. In competing with another facility in the neighborhood, an owner might wish to charge a price marginally lower than the price at the other facility, but not reduced by so much as a quarter dollar per cycle. Such flexibility is not possible with coin operated facilities.

Similarly, because each service device is fitted with a mechanical device for accepting coins, if an owner wishes to change his prices, the mechanical devices must be removed and replaced. This is time consuming and expensive, and cannot be done at frequent intervals. Thus, for example, it is not practical in such a facility to provide discounted rates for particular hours of the day or days of the week, in order to encourage users to use the facility at off-hours.

It is an object of the present invention to provide a laundry service facility management system which does not require the stocking of large numbers of coins in bill changers, which does not collect coins at the service devices or bills at the bill changers, which does not require collection and counting of coins, which permits flexible setting of rates to any desired increment, and which permits flexible resetting of rates as often as desired.

It is a further object of the present invention to provide a laundry service facility management system which can accumulate detailed records of such matters as use of each particular service device, which can be related to time of day or to use of other devices in the facility. An owner of such a facility is thereby enabled to conclude, for example, that particular devices are comparatively unused, and from such information to optimize the physical layout of the facility or the particular mix of service devices. The owner can also track the operating history of any particular device and accumulate information which is relevant to repairs, maintenance and replacement. Furthermore, the owner can use such information to structure his prices, providing discounts for use at times when he finds his facility is lightly used.

SUMMARY OF THE INVENTION

According to the invention, a laundry facility management system comprises a laundry service device providing laundry service, and controlled by an operating control; a local controller connected to the laundry service device; and a central controller. The local controller and central controller are connected together for the transfer of information between them.

The local controller comprises storage providing signals representative of a current device rate, representing the current cost of the laundry service provided by the connected service device, and further comprises a card reader for reading a card identifier provided on and uniquely identifying a service card presented to the card reader by an intending user of the service device. The local controller provides request means responsive to the card reader for deriving from a read card identifier and from the stored current device rate signals an authorization request, and for transmitting the authorization request to the central controller.

The central controller comprises means for receiving an account balance payment message providing a particular card identifier and a payment value, and storage providing stored account balance signals for at least one account, each account being uniquely indexed by a particular card identifier. The central controller further comprises account managing means responsive to a received authorization request for updating the stored account balance indexed by the card identifier of the authorization request by the current device rate value of the authorization request, and for transmitting an authorization message to the local controller.

The local controller has a control output connected to the laundry service device operating control, and is responsive to a received authorization message for outputting a control signal on the control output to control the laundry service device operating control to provide the request laundry service. The account managing means is responsive to a received account balance payment message for crediting the stored account balance indexed by the particular card identifier by the payment value of the received account balance message.

In preferred embodiments, the central controller storage further provides a device rate schedule, and the central controller has means for transmitting to the local controller new device rate signals from the stored device rate schedule, for updating the stored current device rate.

In a preferred embodiment, the laundry facility management system according to the invention comprises a plurality of laundry service devices each providing laundry service, the laundry service devices being of at least two types, and each laundry service device being controlled by operating controls. The system further comprises a central controller, a service card dispenser, and a similar plurality of local controllers, each connected to a laundry service device. The plurality of local controllers, the service card dispenser, and the central controller are connected together for the transfer of information among them.

Each local controller comprises storage providing signals representative of a local controller communications address uniquely identifying the local controller within the facility; current device rate representing the current cost of the laundry service provided by the connected laundry service device; selected language; and device type identifying the type of the connected laundry service device.

Local controller control outputs are connected to the laundry service device operating controls for the output of control signals to the operating controls. The local controller further comprises local controller display means, and display control means responsive to local controller storage for controlling the local controller display means to display in the language indicated by the selected language signals a representation of the current rate to an intending user of the connected laundry service device. A local controller card reader is provided for sensing presence or absence of a service card and for reading a card identifier provided on and uniquely identifying a service card presented to the local controller card reader by an intending user of the connected laundry service device.

Local controller authorization request and transmitting means is responsive to the local controller card reader and to local controller storage for deriving from a read card identifier, from the stored local controller communications address signals, and from stored current device rate signals an authorization request, and for transmitting the derived authorization request to the central controller. The local controller further comprises rate updating means for storing received new current device rate signals in the local controller storage. The local controller is responsive to receipt of a message from the central controller for transmitting an acknowledge message to the central controller.

The card dispenser comprises a payment acceptor, storage, and a card reader. The card dispenser storage provides signals representative of a card dispenser communications address uniquely identifying the card dispenser within the laundry facility. The card dispenser card reader senses presence or absence of a service card and reads a card identifier provided on and uniquely identifying a service card presented to the card dispenser card reader. The card dispenser further comprises a card dispenser display, and display control means responsive to the payment acceptor for controlling the card dispenser display to display a representation of the value of the payment presented to the payment acceptor.

The card dispenser further comprises card supply means responsive to the payment acceptor and to absence of a service card in the card dispenser card reader for supplying a new service card to the dispenser card reader. Card dispenser account request and transmitting means is responsive to the card dispenser card reader, to the payment acceptor, and to the card dispenser storage for deriving from the card identifier read by the dispenser card reader, from the value of payment presented to the payment acceptor, and from the card dispenser communications address, an account request including an "old/new" specifier having one of two values, and for transmitting the derived account request to the central controller.

The card dispenser is responsive to receipt of a message from the central controller for transmitting to the central controller an acknowledge message.

The central controller comprises clock input means for receiving a clock signal, and non-volatile central controller storage. Central controller storage provides signals representative of a device rate schedule for the laundry service devices of the facility, and an account balance for at least one account, each account being uniquely indexed by a particular card identifier. Central controller rate update means is responsive to a clock signal received on the clock input means, to the stored device rate schedule, and to device type signals received from a local controller for transmitting to the local controller new current device rate valid for a current time period.

Central controller account managing means is responsive to an account request received from the card dispenser providing an "old" value of the "old/new" specifier for locating in central controller storage a corresponding stored account indexed by the card identifier of the received account request, and for transmitting to the card dispenser an enable message including the value of the indexed account balance incremented by the value of payment of the received account request. The account managing means is responsive to an account request received from the card dispenser providing a "new" value of the "old/new" specifier for establishing in central controller storage a corresponding stored account indexed by the card identifier of the received account request, and for transmitting to the card dispenser an enable message including the value of payment of the received account request.

The account managing means is responsive to an authorization request received from a local controller for locating in central controller storage a corresponding stored account indexed by the card identifier of the received authorization request, and for comparing the corresponding stored account balance with the device rate of the received authorization request, and is responsive to a positive result of such comparison for transmitting to the local controller an authorization message.

The account managing means is responsive to receipt of an acknowledge message from the card dispenser for incrementing the value of a stored account balance by an amount corresponding to the value of payment of the received account request, and is responsive to receipt of an acknowledge message from a local controller for decrementing the value of a stored account balance by an amount corresponding to the device rate of the received authorization request.

The local controller is responsive to receipt of an authorization message and to stored device type signals for outputting control signals on the control outputs; the local controller display control means is responsive to receipt of an authorization message and to the selected language signals stored in local controller storage for controlling the local controller display to display a representation of the current balance of the stored account indexed by the card identifier of the transmitted authorization request.

The card dispenser card reader means is responsive to receipt of an enable message for releasing a service card from the dispenser; the card dispenser display control means is responsive to receipt of an enable message and to selected language signals stored in the card dispenser storage for controlling the card dispenser display to display a representation of the current balance of the stored account indexed by the card identifier of the transmitted account request.

DRAWINGS

FIG. 1 schematically illustrates the lay-out of a public laundry facility in which the invention operates;

DESCRIPTION OF THE PREFERRED EMBODIMENT

Figure 1:
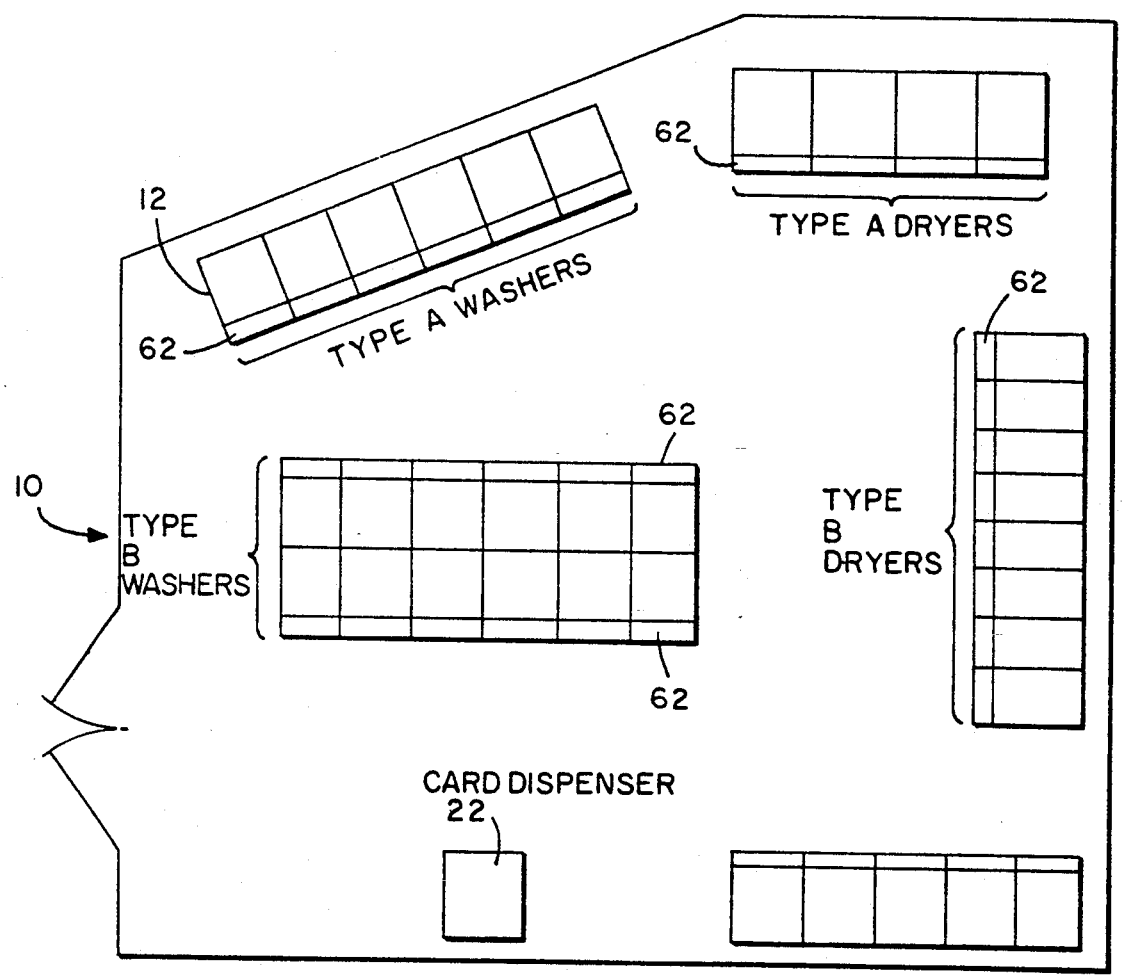

Referring now to the drawing, and in particular to FIG. 1, a public laundry facility 10 provides a plurality of laundry service devices each providing laundry service. In such a facility there are typically several types of service devices, multiples of each type being provided. For example, the facility shown in FIG. 1 provides two types of washing machines, Type A washers including device 12, which are standard washing machines, and Type B washers including device 14, which are heavy-duty washing machines. In addition, the facility of FIG. 1 provides Type A dryers including dryer 16, which are large capacity dryers, and Type B dryers including dryer 18, which are of smaller capacity. Other types of service devices may be provided.

Figure 2:
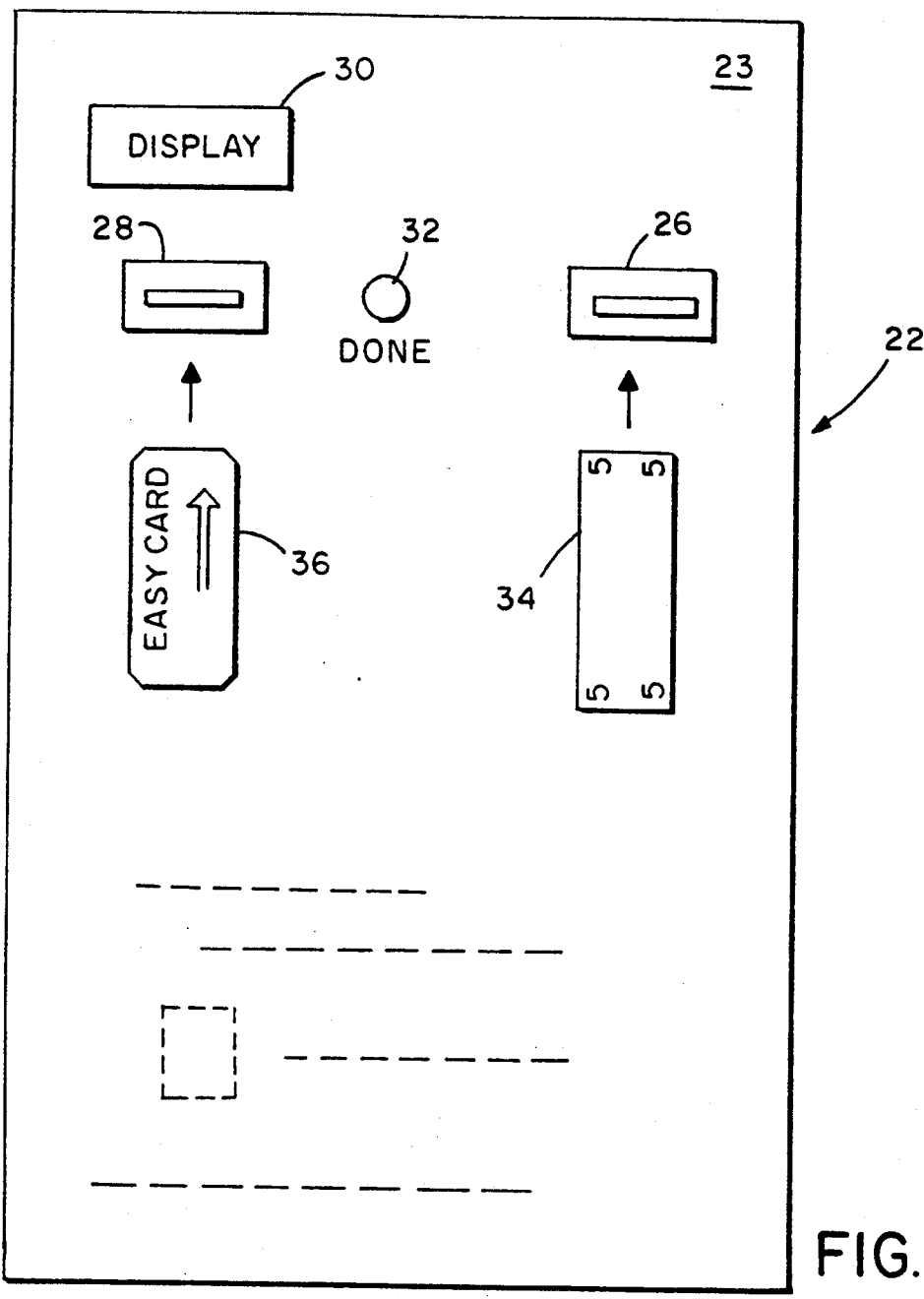
FIG. 2 shows the exterior of the housing of the card dispenser of the invention.

Facility 10 provides a card dispenser 22. Referring now to FIG. 2, the housing 23 of card dispenser 22 provides a bill acceptor slot 26 and a card reader slot 28, a display 30 and a DONE (transaction terminated) button 32. Various printed and pictorial information, not shown in the drawing, is provided on the exterior of card dispenser 22 to instruct an intending user. According to this information, to initiate various operations of card dispenser 22, as will be explained, a currency bill 34 may be inserted into bill acceptor slot 26 or a previously dispensed service card 36, if the intending user has one, may be inserted into card reader slot 28.

Figure 5:
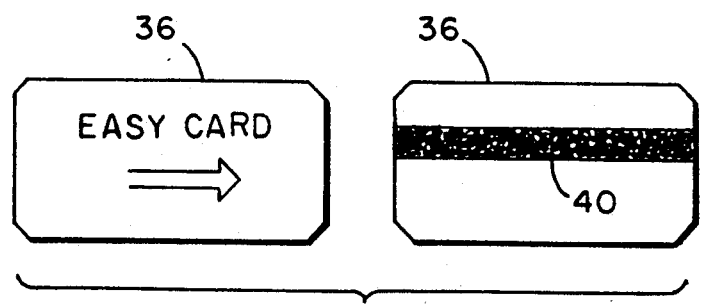
FIG. 5 shows two views of a service card employed in the system of the invention.

A card identifier uniquely identifies the service card on which it is provided. In preferred embodiments, the card identifier is magnetically encoded and carried on a magnetic strip on card 36; in alternative embodiments, the card identifier may be provided by a bar code printed on the card, or by a pattern punched on the card, or any other suitable means which is machine-readable. In addition, the card identifier is printed on the card. Referring now to FIG. 5, both faces of the service card 36 employed in the preferred embodiment of the laundry facility management system of the invention are shown. On one side of card 36 is an indicator 38 showing which way to insert card 36 into card reader slot 28; on the other side of card 36 is a magnetic strip 40. A card identifier is magnetically encoded and carried on strip 40.

Figure 3:
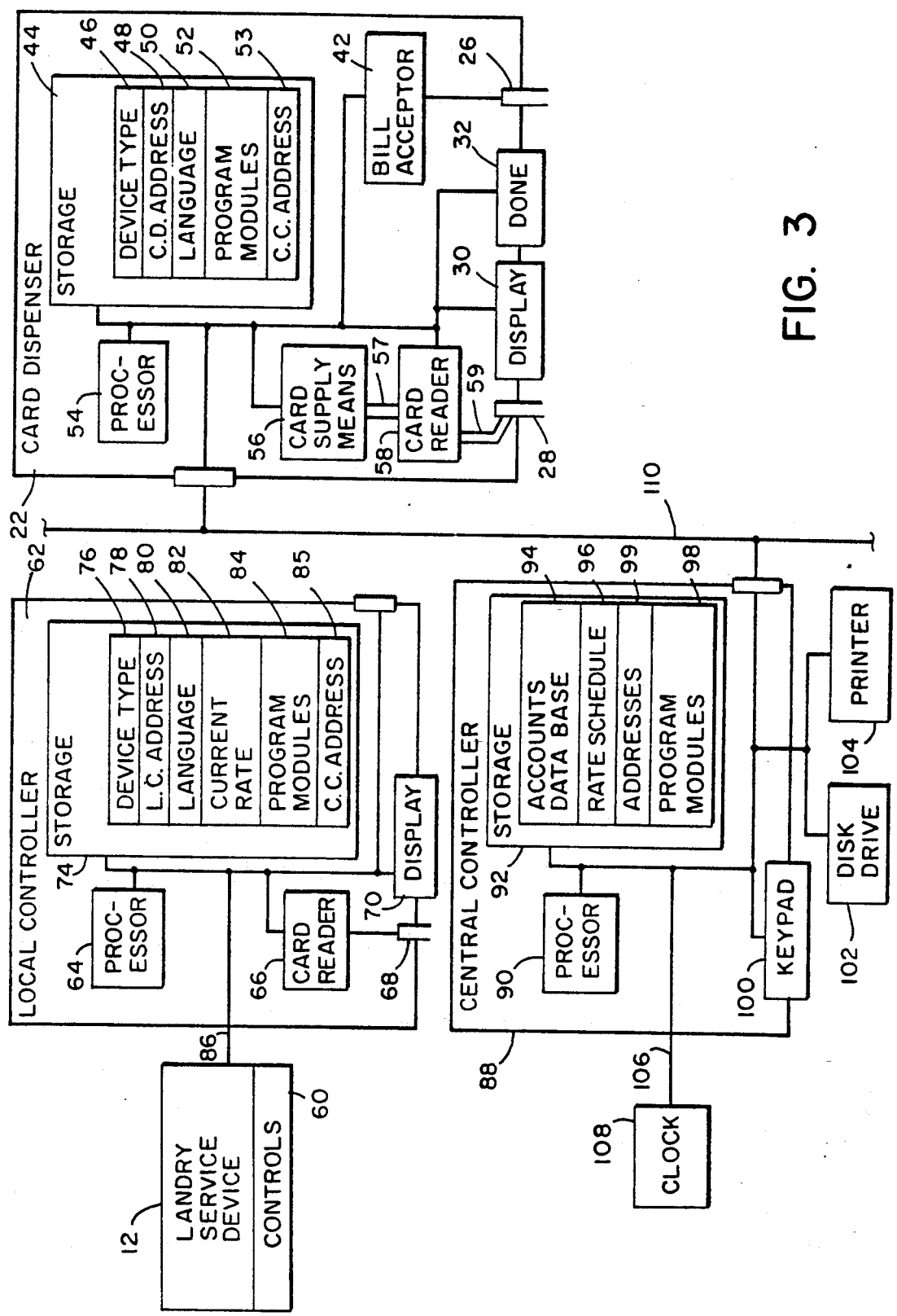
FIG. 3 shows a local controller, a central controller, and a card dispenser, connected together according to the invention.

Referring now to FIG. 3, card dispenser 22 provides a payment acceptor, which in the preferred embodiment is a bill acceptor 42, connected to bill acceptor slot 26. Card dispenser 22 provides storage 44, which stores signals representing card dispenser device type (at 46), card dispenser communications address (at 48), central controller communications address (at 53), selected language (at 50), and a number of program modules (at 52) to be described in more detail in connection with FIG. 4. The central controller communications address may be provided by central controller 88 when the system is initialized, or in any other convenient manner. The card dispenser communications address and device type are desirably provided by setting appropriate switches when the system is installed.

Card dispenser 22 further provides a processor 54; processor 54 operates according to the instructions of program modules stored at 52 to provide the functions and operations of the card dispenser as described herein. Card dispenser further provides a card supply means 56. A card dispenser card reader 58 is connected to card reader slot 28; card reader 58 senses the presence or absence of a service card 36 in slot 28, and reads the card identifier provided on strip 40 of card 36. Processor 54, storage 44, card supply means 56, bill acceptor 42, card reader 58, display 30, and DONE button 32 are all connected together for the transfer of information among them. Card supply means 56 is connected to card reader 58 by a mechanical path 57 for the transport of a new card 36 to card reader 58; the new card is then transported through mechanical path 59 to card reader slot 28.

Service device 12 (a Type A washer, as seen in FIG. 1) is physically operated by operating controls 60. A local controller 62 is connected to service device 12. Local controller 62 provides a processor 64, a card reader 66 connected to a card reader slot 68, and a display 70. Further, local controller 62 provides storage 74, providing signals representing local controller device type (at 76), local controller communications address (at 78), central controller communications address (at 85), current device service rate (at 82), and program modules (at 84) to be described in more detail in connection with FIG. 4. The central controller address may be provided by the central controller when the system is initialized. The local controller communications address and local controller device type are desirably provided by setting appropriate switches when the system is installed. Processor 64 operates according to the instructions of program modules stored at 84 to provide the operations and functions of the local controller as described herein. Card reader 66 senses the presence or absence of a card 36 in slot 68, and reads the card identifier provided in strip 40 on card 36. Processor 64, storage 74, card reader 66, and display 70 are connected together for the transfer of information among them. Local controller 62 is connected to service device 12 through a control output line 86, connected to device operating controls 60 for the output of control signals to the operating controls.

In alternative embodiments, the card identifier may be input to local controller 62 by entering it through a keypad provided by local controller 62, rather than by reading it from a card.

A central controller is provided in facility 10, and is desirably housed in the card dispenser housing. (If a second central controller is provided, for redundancy in the system, it may be housed separately.) Central controller 88 provides a processor 90, and storage 92. Storage 92 provides signals representing a stored accounts database (at 94), a rate schedule 96 providing various rates for service by each service device in facility 10, and program modules (at 98) to be described in more detail in what follows. Processor 90 operates according to the instructions of the program modules stored at 98 to provide the operations and functions of the central controller described herein. The accounts database stored at 94 provides account balances for established accounts, each account being uniquely indexed by a card identifier provided on a previously dispensed card. Addresses of local controllers and of the card dispenser are stored at 99 for use in communications within the system.

A keypad 100 is provided for the input of commands and data to central controller 88. A disk drive 102 and a printer 104 are desirably provided for logging and archival storage of various information, as will be described. A clock input line 106 is provided, for receiving clock signals from clock 108. Date information may be derived from the clock signals or otherwise input.

Processor 90, storage 92, keypad 100, disk drive 102, printer 104, and clock input 106 are connected together for the transfer of information among them.

Card dispenser 22, central controller 88, and, for each service device in facility 10, a local controller 62, are connected together by network line 110 for the transfer of information among them. It will be appreciated that a plurality of local controllers 62 are connected to line 110 but not shown in FIG. 3. Line 110 desirably provides two signal conductors (high and low) comprising a single channel, carrying bi-directional data using RS-485 standard signal levels.

Figures 4, 6:
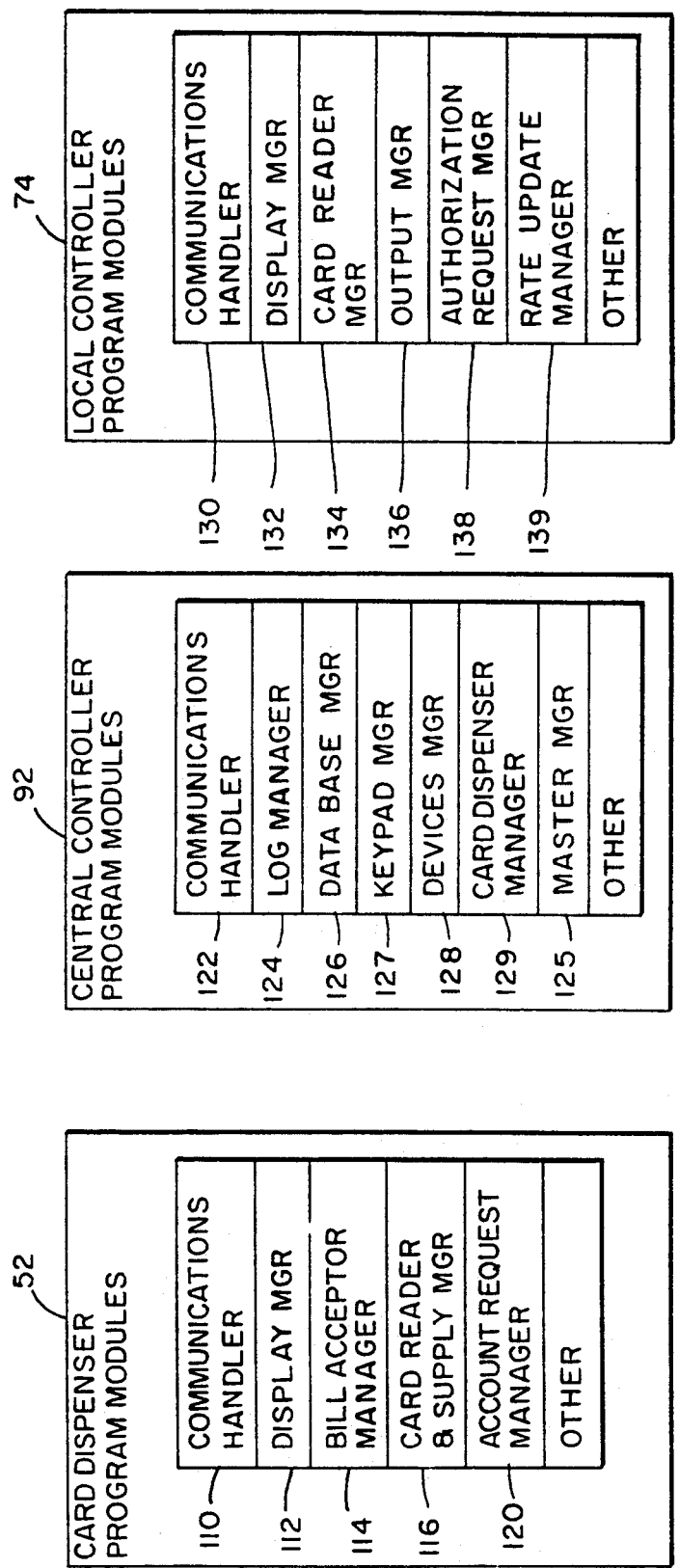
FIG. 4 shows particular portions of the local controller storage, the central controller storage, and the card dispenser storage according to the invention.
FIG. 6 shows the format of messages and requests transmitted among the local controllers, central controller, and card dispenser of the system of the invention.

Referring now to FIG. 4, card dispenser storage 44 provides program modules 52, including communications handler 110, display manager 112, bill acceptor manager 114, card reader and card supply manager 116, and account request manager 120. Central controller storage 92 provides program modules 92, including communications handler 122, log manager 124, master manager 125, database manager 126, keypad manager 127, devices manager 128, and card dispenser manager 129. Local controller storage 74 provides program modules 74, including communications handler 130, display manager 132, card reader manager 134, control output manager 136, account request manager 138, and rate update manager 139.

Referring now to FIG. 6, messages and requests transmitted among the local controllers, central controller, and card dispenser begin with a SOM (start of message) field and end with an EOM (end of message) field. A "from address" (address of the sending device), a "to address" (address of the destination device), a "message type", and if necessary a variable amount of data are included in the message. Message type may be, for example, "account request new", "account request old", "enable", "acknowledge", and so forth as required. The sending and receiving of messages and requests are handled by the device processors, each operating according to a communications handler program module. A collision-detection-random-retry protocol is employed.

System Operation

In order to use the laundry facility, an intending user must obtain a service card. A service card is obtained from card dispenser 22; in addition, a system user may read the balance value associated with a previously obtained card, or update the value of a previously obtained card.

Reading Current Balance

The user inserts a previously obtained service card 36 into slot 28. Card reader 58 senses the presence of the card, and reads the card identifier. Card dispenser processor 54, operating according to account request manager module 120 and communications handler 130, and responsive to card reader 58, to bill acceptor 42, and to addresses stored at 48 and 53, derives from the read card identifier an account request of the general form shown in FIG. 6. The "message type" is "account request old". The card identifier and a value of "0.00" are transmitted as data. Processor 54 transmits the derived account request to central controller 88.

Central controller processor 90, operating according to communications handler 122 and database manager 126, and responsive to the account request received from card dispenser 22 providing an "old" value of the "old/new" specifier, locates in the accounts database stored at 94 a stored account, indexed by the card identifier of the received account request. When the indexed account is located, processor 90 transmits an enable message to card dispenser 22. The enable message includes as data the value of the balance of the indexed account. The account balance value will be incremented by "0.00".

Card dispenser 22, in response to the enable message, displays the balance value. Card dispenser processor 54, operating according to display manager module 112 and responsive to selected language signals stored at 50, controls display 30 to display a representation of the balance value. Card dispenser 22 transmits an acknowledge message to central controller 92. The user, having read the display, terminates the transaction by pushing DONE button 32 and removes his card.

If no account is located, a non-enable message is transmitted to card dispenser 22.

Updating Previously Obtained Card

Having inserted his card as described above, the user inserts a currency bill into bill acceptor slot 26. The value of the inserted bill is sensed by bill acceptor 42. Card dispenser processor 54, operating according to account request manager module 120 and communications handler 130, and responsive to card reader 58, to bill acceptor 42, and to addresses stored at 48 and 53, derives from the read card identifier an account request of the general form shown in FIG. 6. The "message type" is "account request old". The card identifier and value of the inserted currency bill are transmitted as data. Processor 54 transmits the derived account request to central controller 88.

Central controller processor 90, operating according to database manager 126, and responsive to the account request received from card dispenser 22 providing an "old" value of the "old/new" specifier, locates in the accounts database stored at 94 the stored account, indexed by the card identifier of the received account request. When the indexed account is located, processor 90 transmits an enable message to card dispenser 22. The enable message includes as data the value of the previous balance of the indexed account incremented by the value of the inserted bill.

Card dispenser 22, in response to the enable message, displays the incremented balance. Card dispenser processor 54, operating according to display manager module 112 and responsive to selected language signals stored at 50, controls display 30 to display a representation of the incremented balance value. Card dispenser 22 transmits an acknowledge message to central controller 92.

In response to the acknowledge message, central controller 92 increments the indexed account by an amount corresponding to the value of payment of the account request. Having read the incremented balance value, the user terminates the transaction by pushing DONE button 32. The system user removes his card, and his account is incremented by the value of the bill he has inserted into the card dispenser.

Obtaining a New Service Card

The user inserts a currency bill as described above. Card reader 58 senses the absence of a card in card reader slot 28. Card dispenser processor 54, operating according to card reader and supply manager 116, controls card supply means 56 to cause a new card to be transported through paths 52 and 59 to card reader slot 28. Card reader 58 reads the card identifier. The value of the inserted bill is sensed by bill acceptor 42. The card dispenser thereafter operates as described above for updating a previously obtained card, except that the account request "message type" is "account request new".

Central controller processor 90, operating according to database manager 126, and responsive to the account request received from card dispenser 22 providing a "new" value of the "old/new" specifier, establishes in the accounts database stored at 94 a stored account, indexed by the card identifier of the received account request. When the indexed account has been established, processor 90 transmits an enable message to card dispenser 22. The enable message includes as data the value of the currency bill as specified by the account request. This value will be the value of the account balance.

Card dispenser 22, in response to the enable message, displays the account balance. Card dispenser processor 54, operating according to display manager module 112 and responsive to selected language signals stored at 50, controls display 30 to display a representation of the account balance value. Card dispenser 22 transmits an acknowledge message to central controller 92.

In response to the acknowledge message, central controller 92 increments the newly established account by an amount corresponding to the value of payment of the account request. Having read the display, the user terminates the transaction by pushing DONE button 32. The system user receives his new card, and his account is established with the value of the bill he has inserted into the card dispenser.

Obtaining Laundry Services

In operation, local controller processor 64 operating according to display manager module 132, and responsive to selected language signals stored at 80 and to current rate signals stored at 82, controls display 70 to display in the selected language a representation of the current rate to an intending user of the connected service device 12. This rate display is the default display of the local controller.

To obtain laundry services, an intending user presents his service card 36 to a local controller by inserting it into card reader slot 68. Card reader 66 senses the presence of card 36, and reads the card identifier. Local controller processor 64 operating according to authorization request module 138 and communications handler module 130, and responsive to card reader 66 and storage 74, derives from the read card identifier of card 36 in slot 68, from the address signals stored at 78 and 85, and from current rate signals stored at 82, an authorization request. Processor 64 transmits the derived authorization request over line 110 to central controller 88. The authorization request includes as data the card identifier and the current device rate.

Central controller processor 90, operating according to devices manager module 128, and responsive to the authorization request received from local controller 62, locates in the accounts database stored at 94 a stored account, indexed by the card identifier of the received authorization requests. When the indexed account is located, processor 90 transmits an authorization message of the general form shown in FIG. 6 to local controller 62. The authorization message includes as data the value of the previous balance of the indexed account decremented by the current rate of the authorization request.

Local controller 62, in response to the authorization message, displays the decremented balance. Local controller processor 64, operating according to display manager module 132 and responsive to selected language signals stored at 80, controls display 70 to display a representation of the decremented balance value. Local controller 62 transmits an acknowledge message to central controller 88. Operating according to output manager module 136, and responsive to device type signals stored at 76, local controller processor 64 provides output control signals on line 86, appropriate to the service device 12. In response, controls 60 operate to initiate operation of the service device.

In response to the acknowledge message, central controller 88 decrements the indexed account by an amount corresponding to the current rate for service by the device.

If no account indexed by the card identifier is found in the database, central controller 88 transmits a "no authorization" message.

If more than one unit of service is desired by the user, he inserts his service card 36 a number of times corresponding with the number of units of service. For example, if a dryer provides 10-minute units of drying time, and the user wants 30 minutes of drying time, he inserts his card three times. This is treated at three separate transactions by the local controller, which send three successive control signals to the dryer controls. The dryer keeps track of the number of cycles requested in the same manner as dryers do which are equipped with coin operated controls.

Current Rate Updating

New current rate information may be obtained by a request initiated by local controller 62, or central controller 88 may poll the local controllers and thereafter send to each new current rate messages. Such updating of rates may be scheduled, responsive to clock signals received on clock input line 106, or may be commanded by signals input to central controller 88 on keypad 100. Processor 90, operating according to devices manager module 128 and communications handler 122, and responsive to the rate schedule signals stored at 96, handles the communication of new device rates to the local controllers. In this manner device rates may be regularly varied with time of day, or day of week, or irregularly varied to provide across the board price changes or special promotions.

Local controller processor 64, operating according to rate update manager 139, stores at 82 received new current rate signals, which are written over the old signals.

Logging and Printing Archived Records

Operating according to log manager module 124, central controller processor 90 controls the reading and writing of a disk by disk drive 102, and the operation of a printer 104. The operation of these devices may be scheduled to occur regularly, responsive to a clock signal received at 106, or may be commanded by commands input through keypad 100. (The input of data or commands through keypad 100 is managed by processor 90 operating according to the keypad manager module 127.) Further, a local controller processor 64, operating according to module 138, responds to a confirmation from device 16 that device 12 has in fact started operation, to send a message to central controller 88 requesting it to log an appropriate record to a disk in disk drive 102 or to printer 104. Any desired records of service device use, operating errors, and the like may be obtained in this manner by the operator of the laundry facility.

Alternative Embodiment

In an alternative embodiment, an intending user need not physically present his service card to obtain service by a service device. An input means such as a keypad is provided on the local controller, permitting the user to input the card identifier, which is then verified in the manner already described.

"Route Operator" Embodiment

In an alternative embodiment, a relatively small laundry facility (for example, three washers and three dryers) is installed at an apartment building, a university dormitory, or other non-public location for the use of persons such as residents or students having a right to be present at the location. A "route operator" is typically a laundry machine distributor who installs and maintains the service devices of such small facilities in a large number of locations.

To manage such facilities according to the present invention, each service device of a facility is connected to a local controller 62 of the kind already described and shown. A central controller 88 of the kind already described and shown is connected to the local controller for the transfer of information between them. Local controller and central controller operate as has been described to derive and transmit authorization requests, locate accounts in the accounts database, transmit authorization messages, decrement accounts and output control signals to service devices. However, no card dispenser is located at the facility. Upon payment by an intending user, service cards are supplied by the route operator, either directly, or indirectly through the landlord or other management of the premises on which the facility is located.

Central controller 88 in addition to the elements shown and described, provides in storage 92 a facility identifier uniquely identifying the facility among those on the operator's route, and is connected through a modem to a telephone line. A remote unit is also connected to a telephone line. Central controller 88 at predetermined times dials up the remote unit, identifying itself by the stored facility identifier, to upload current card balances (after decrements for service device operation) and records of service device usage. The remote unit downloads changes to the rate schedule, new account information, and changes to account balances. Central controller 88 responds to new account information and account balance changes to increment the stored accounts and establish new accounts.

This management system has several advantages. No money is kept on the premises of the facility, reducing the likelihood of theft and vandalism. The route operator does not need to collect and count coins from each facility, keeping the coins of each facility separate from those of the others in order to pay a share to the owner of the premises. Finally, as with the previously described public laundry facility, the intending user does not need to accumulate and bring with him a sufficient quantity of coins, and service rates can be flexibly altered as frequently as desired and to within as fine an increment as desired.

An additional feature is provided in this embodiment. Central controller 488 provides a voice chip 450 for synthesizing voice communications. Further, central controller 488 stores at 456 in storage 92 status information of the kind described as logged to disk drive 102 and printer 104. This information includes the facts that particular service devices are in operation. An intending user of the facility may dial up central controller 488 from his telephone. Processor 90, operating according to instructions in communications handler 122, derives from status information stored at 456 a message reporting which service devices are available to a user, identifying each by a machine number or other service device identifier, and controls voice chip 450 to provide corresponding audible information. The intending user, by means of his telephone keypad, inputs the machine number identifying a particular service device among those not in use, together with his card identifier. Central controller 488 thereupon transmits to local controller 62 of the identified service device a message reserving the device for a limited period of time; that is, the local controller will not respond to the presentation of any other service card during that interval. If the intending user presents his own service card to the local controller within the reserve period, his account is decremented by the current device rate together with a reservation fee. If the intending user does not present his service card within the reserve period, at the expiration of the reserve period central controller 488 releases the service device. Responsive to the card identifier input over the telephone line, central controller 488 decrements the corresponding account balance stored at 94 by a service fee.

Redundancy and Security of Account Records

In managing a laundry service facility of the kind described herein, it is highly desirable to maintain, so far as possible, the integrity of the account records and the operability of both service devices and card dispensers against such hazards as component failure or theft. For this purpose, in preferred embodiments, redundancy of operation is provided.

Figure 7:
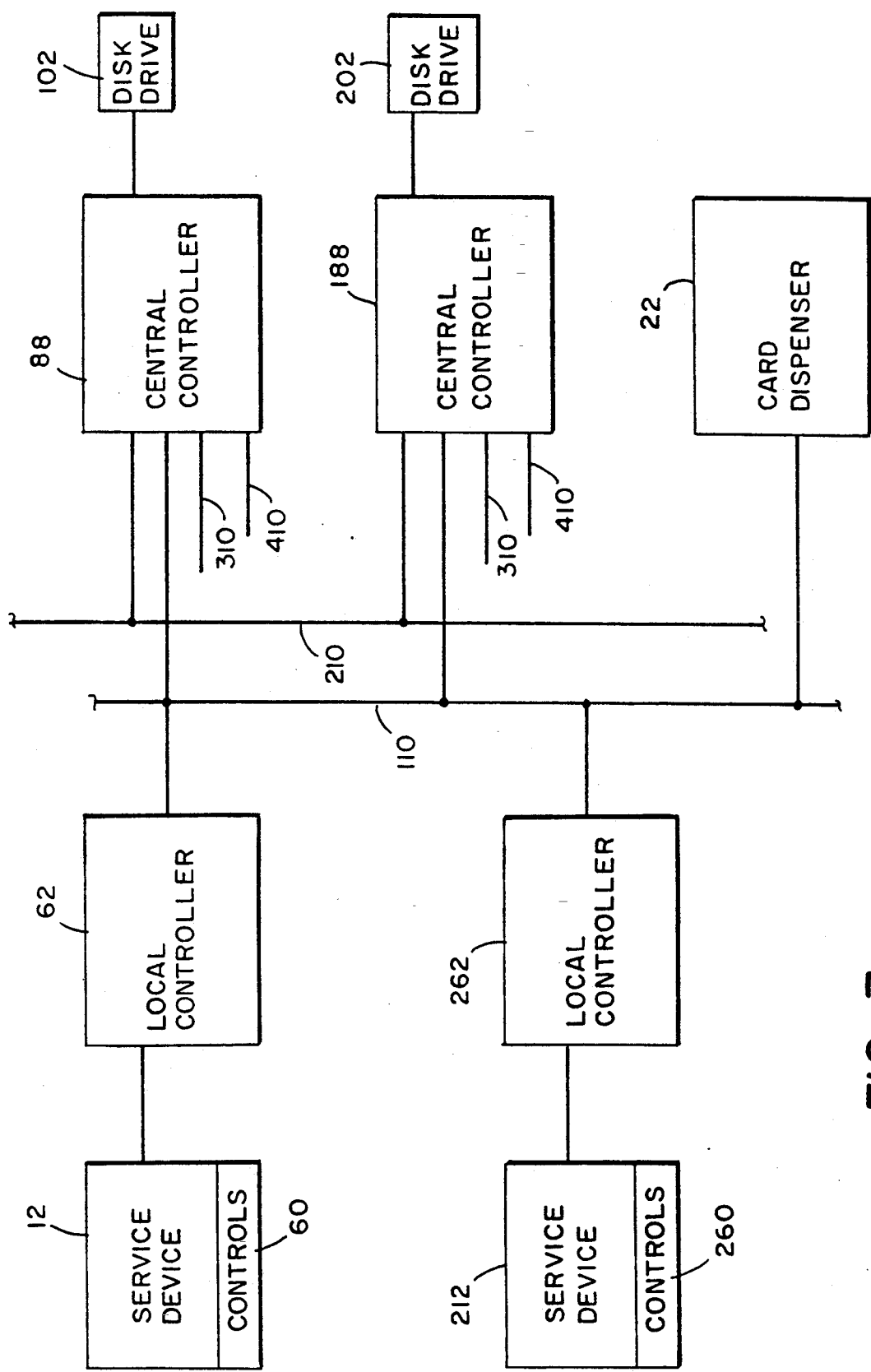
FIG. 7 shows a public laundry facility according to the invention providing communications and management redundancy.
Figure 8:
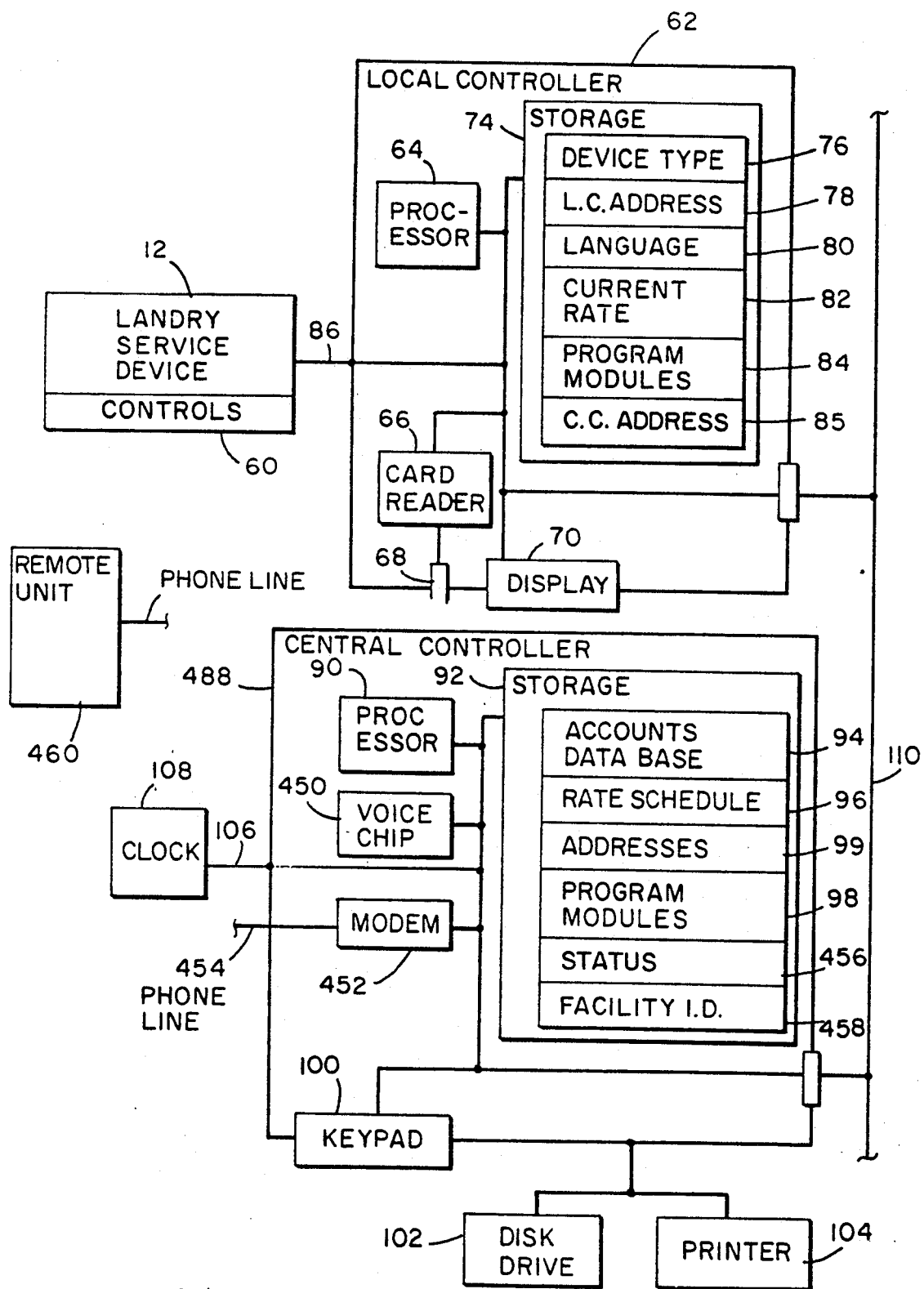
FIG. 8 shows an alternative embodiment of the system of the invention.

Referring now to FIG. 7, two central controllers 88 and 188 are provided, with a card dispenser 22. One of the central controllers is desirably housed with card dispenser 22; the second central controller may be separately housed. Four independent network lines 110, 210, 310 and 410 are provided, each central controller being connected to all four network lines. One fourth of the service devices of the facility are connected (each through its local controller) to any network line. Each network line comprises a channel. In a system providing such redundancy, communications addresses must include a channel specification, and messages transmitted among the system elements must include a specification of the channel to be used. In such a system, a physical break in a network line results at most in one quarter of the service devices becoming inoperative by means of a service card.

The module storage 84 of each central controller provides a master manager program module 125 (FIG. 4). This module includes initializing routines, including a bidding routine by which a central controller contends to become the master in the system network. Only one of the two central controllers can be master; the other functions as a backup. During operation of the system, each controller keeps track of errors; a critical number of errors will cause a master central controller to disable itself as a master and assume back-up status. This is detected by the other central controller, which is then forced to assume master status. The detected errors are logged to disk and/or printer.

In a system providing redundancy, the accounts database is stored in duplicate at the central controllers. Each central controller's master program module 125 further provides instructions for updating the accounts databases kept at all other central controllers, whenever an account is established or its balance incremented or decremented at one central controller. This provides back-up capacity in case one central controller becomes inoperative.

What is claimed is:

1. Card payment system for service dispensing devices comprising
    a plurality of service dispensing devices, said service dispensing devices being of at least two types, each said service dispensing device being controlled by operating controls,
    a similar plurality of local controllers, connected respectively to said service dispensing devices,
    a central controller, and
    a service card dispenser,
    said plurality of local controllers, said service card dispenser, and said central controller being connected together for the transfer of information thereamong,
    each said local controller comprising
        storage providing signals representative of
            local controller communications address uniquely identifying said local controller,
            current device rate representing current cost for service from said connected service dispensing device,
            selected language, and
            device type specifying the type of said connected service dispensing device,
        control output connected to said service dispensing device operating controls for the output of control signals to said operating controls,
        local controller display means,
        display control means responsive to said local controller storage for controlling said local controller display means to display in the language indicated by said selected language signals a representation of said current rate to an intending user of the connected said service dispensing device,
        a local controller card reader for reading a card identifier provided on and uniquely identifying a service card presented to said local controller card reader by an intending user of the connected said service dispensing device,
        authorization request and transmitting means for deriving and transmitting to said central controller an authorization request, said authorization request being derived from a card identifier of a card presented to said card reader and from said signals representative of said local controller communications address,
        rate updating means for storing received new current device rate in said local controller storage,
        said local controller being responsive to receipt of a message from said central controller for transmitting an acknowledge message to said central controller,
    said card dispenser comprising
        a payment acceptor
        storage providing signals representative of a card dispenser communications address uniquely identifying said card dispenser,
        a card dispenser card reader for sensing presence or absence of a service card and for reading a card identifier provided on and uniquely identifying a service card presented to said card dispenser card reader, and
        a card dispenser display,
        display control means responsive to said payment acceptor for controlling said card dispenser display to display a representation of the value of the payment presented to said payment acceptor,
        card supply means responsive to said payment acceptor and to absence of a service card in said card dispenser card reader for supplying a new service card to said dispenser card reader, and
        account request and transmitting means responsive to said card dispenser card reader, to said payment acceptor, and to said card dispenser storage for deriving from the card identifier read by said dispenser card reader, from the value of payment presented to said payment acceptor, and from said card dispenser communications address, an account request including an "old/new" specifier having one of two values, and for transmitting the derived said account request to said central controller,
        said card dispenser being responsive to receipt of a message from said central controller for transmitting to said central controller an acknowledge message,
    said central controller comprising
        clock input means for receiving a clock signal,
        non-volatile central controller storage providing signals representative of
            device rate schedule for said service devices, account balance for at least one account, each said account being uniquely indexed by a particular card identifier, and rate update means responsive to a clock signal received on said clock input means, to stored said device rate schedule, and to device type signals received from a said local controller for transmitting to said local controller new current device rate valid for a current time period, account managing means responsive to a said account request received from said card dispenser providing an "old" value of said "old/new" specifier for locating in said central controller storage a corresponding stored account indexed by the card identifier of the received said account request, and for transmitting to said card dispenser an enable message including the value of said indexed account balance incremented by the value of payment of said received account request, said account managing means being responsive to a said account request received from said card dispenser providing a "new" value of said "old/new" specifier for establishing in said central controller storage a corresponding stored account indexed by the card identifier of the received said account request, and for transmitting to said card dispenser an enable message including the value of payment of said received account request, said account managing means being responsive to a said authorization request received from a said local controller for locating in said central controller storage a corresponding stored account indexed by the card identifier of the received said authorization request, and for comparing said corresponding stored account balance with the device rate of said received authorization request, and responsive to a positive result of such comparison for transmitting to said local controller an authorization message, said account managing means being responsive to receipt of an acknowledge message from said card dispenser for incrementing the value of a said stored account balance by an amount corresponding to the value of payment of said received account request, said account managing means being responsive to receipt of an acknowledge signal from a said local controller for decrementing the value of a said stored account balance by an amount corresponding to the device rate of said received authorization request, said local controller being responsive to receipt of a said authorization message for outputting control signals on said control outputs, said local controller display control means being responsive to receipt of a said authorization message and to said selected language signals stored in said local controller storage for controlling said local controller display to display a representation of the current balance of said stored account indexed by the card identifier of the transmitted said authorization request, said card dispenser card reader means being responsive to receipt of a said enable message for releasing a service card from said dispenser, said card dispenser display control means being responsive to receipt of a said enable message and to said selected language signals stored in said card dispenser storage for controlling said card dispenser display to display a representation of the current balance of said stored account indexed by the card identifier of the transmitted said account request.

2. Card payment system for service dispensing devices comprising a plurality of service dispensing devices, said service dispensing devices being of at least two types, each said service dispensing device being controlled by operating controls, a similar plurality of local controllers, connected respectively to said service dispensing devices, a central controller, and a service card dispenser, said plurality of local controllers, said service card dispenser, and said central controller being connected together for the transfer of information thereamong, each said local controller comprising storage providing signals representative of current unit cost of service provided by said connected service dispensing device, a control output connected to said operating control of the connected said service dispensing device for the output of a control signal to said operating control, a local controller card reader for reading a card identifier provided on and uniquely identifying a service card presented to said local controller card reader by an intending user of the connected said service dispensing device, and authorization request and transmitting means for deriving and transmitting to said central controller an authorization request, said authorization request being derived from a card identifier of a card presented to said card reader and from said signals representative of said local controller communications address, said card dispenser comprising a payment acceptor a card dispenser card reader for sensing presence or absence of a service card and for reading a card identifier provided on and uniquely identifying a service card presented to said card dispenser card reader, account request and transmitting means responsive to said card dispenser card reader, and to said payment acceptor, for deriving from the card identifier read by said dispenser card reader, and from the value of payment presented to said payment acceptor an account request, and for transmitting the derived said account request to said central controller, said central controller comprising non-volatile central controller storage providing signals representative of device rate schedule for said service dispensing devices, account balance for at least one account, each said account being uniquely indexed by a card identifier, and rate update means responsive to stored said device rate schedule signals for transmitting to a said local controller new current device rate, account managing means responsive to a said account request received from said card dispenser for incrementing, by the value of payment of said received account request, the value of a said stored account balance indexed by the card identifier of said received account request, and for transmitting to said card dispenser an enable message, said account managing means being responsive to a said authorization request received from a said local controller for transmitting to said local controller an authorization message, and when the current unit cost of the service requested is not more than the account balance indexed by the card identifier of the received authorization request, decrementing the so indexed account balance by the current unit cost of the service requested, said local controller being responsive to receipt of a positive said authorization message for outputting a control signal on said control output, said card dispenser card reader means being responsive to receipt of a said enable message for releasing a service card from said dispenser.

3. The system of claim 2,
said central controller storage further providing signals representative of
a facility identifier uniquely identifying said facility, and
device rate schedule,
said central controller further comprising
means for transmitting to said local controller new device rate signals from the stored device rate schedule, for updating the stored current device rate,
means for transmitting over the telephone line a schedule update request providing said stored facility identifier, for receiving over the telephone line a schedule update message providing a new device rate schedule for said facility, and for updating said stored device rate schedule signals corresponding with said received new device rate schedule signals.

4. The management system of claim 2, said service dispensing devices being of at least two types, each said local controller storage further providing signals representative of device type specifying the type of said connected laundry service device,
said local controller being responsive to receipt of a said authorization message for outputting said control signal on said control output.

5. The management system of claim 4, in which said local controller storage providing said signals representative of device type comprises settable switches.

6. The management system of claim 4, said central controller rate update means being responsive to a clock signal, to stored device rate schedule signals for transmitting to said local controller new current device rate valid for a current time period.

7. The management system of claim 2, further comprising card supply means connected to said service card dispenser, said card supply means being responsive to said payment acceptor, and to absence of a service card in said card dispenser card reader for supplying a new service card to said dispenser card reader.

8. The management system of claim 2, each said local controller further comprising
display means,
display control means responsive to said local controller storage for controlling said local controller display means to display a representation of said current rate to an intending user of the connected said laundry service device,
said local controller display control means being responsive to receipt of a said authorization message for controlling said local controller display to display a representation of the current balance of said stored account indexed by the card identifier of the transmitted said authorization request.

9. The management system of claim 8, said local controller storage further providing signals representative of selected language,
said local controller display control means being further responsive to said local controller storage for controlling said local controller display means to display in the language indicated by said selected language signals a representation of said current rate to an intending user of the connected said laundry service device, and for controlling said local controller display means to display in the language indicated by said selected language signals a representation of the current balance of said stored account indexed by the card identifier of the transmitted said authorization request.

10. The management system of claim 9, in which said local controller storage providing said signals representative of selected language comprises settable switches.

11. Retail service facility management system comprising
a retail service device providing a service, and controlled by an operating control,
a local controller connected to said retail service device,
a central controller,
said local controller and said central controller being connected together for the transfer of information between them,
said local controller comprising
storage providing signals representative of current device rate, representing a current unit cost of the service provided by the connected said retail service device,
a card reader for reading a card identifier provided on an uniquely identifying a service card presented to said card reader by an intending user of said retail service device,
request means responsive to said card reader for deriving from a card identifier read from a card presented to said card reader and from stored signals identifying said local controller an authorization request and for transmitting said authorization request to said central controller,
said central controller comprising
means for receiving an account balance payment message providing a particular card identifier and a payment value,
storage providing
stored account balance data for at least one account, each said account being uniquely indexed by a particular card identifier, and
account managing means responsive to a received said authorization request for updating said stored account balance data indexed by the card identifier of said authorization request by the current device rate value of said authorization request, and for transmitting to said local controller an authorization message, account managing means responsive to an authorization request received from said local controller for transmitting to said local controller an authorization message authorizing or denying a requested service, and when the current unit cost of the service requested is not more than the account balance indexed by the card identifier of the received authorization request, decrementing the so indexed account balance by the current unit cost of the service requested, said local controller having a control output connected to said retail service device operating control, and being responsive to a received said authorization message for outputting a control signal on said control output to control said retail service device operating control to provide the requested service, said account managing means being responsive to a received said account balance payment message for crediting said stored account balance indexed by said particular card identifier by the payment value of said received account balance payment message, said central controller storage further providing signals representative of a facility identifier uniquely identifying said facility, and device rate schedule, said central controller further comprising means for transmitting to said local controller new device rate signals from the stored device rate schedule, for updating the stored current device rate, means for transmitting over the telephone line a schedule update request providing said stored facility identifier, for receiving over the telephone line a schedule update message providing a new device rate schedule for said facility, and for updating said stored device rate schedule signals corresponding with said received new device rate schedule signals.

* * * * *